June 29, 1965  A. J. SHELTON  3,191,995
FOLDING ARM REST
Filed Sept. 12, 1963  2 Sheets-Sheet 2
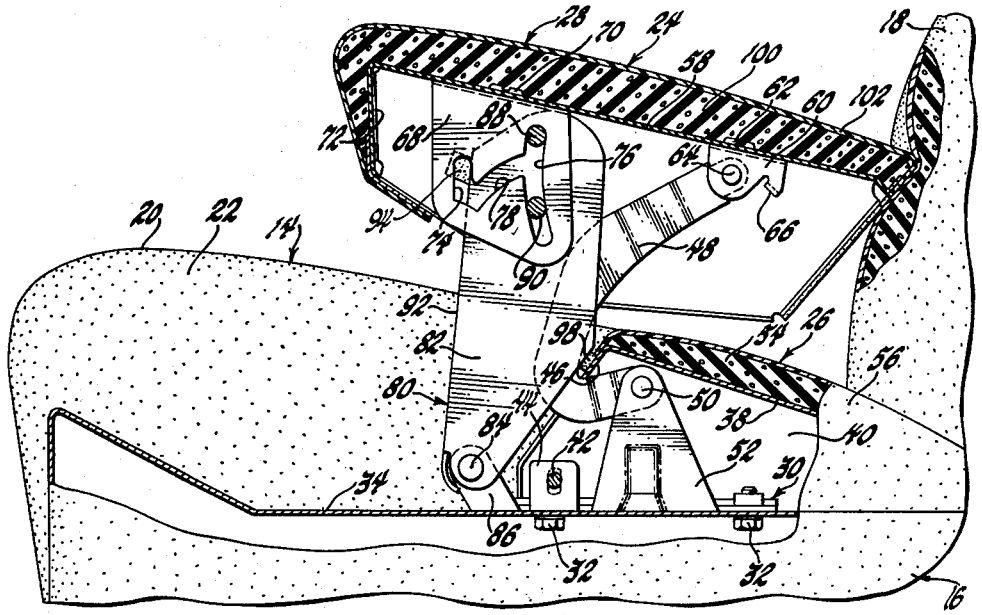
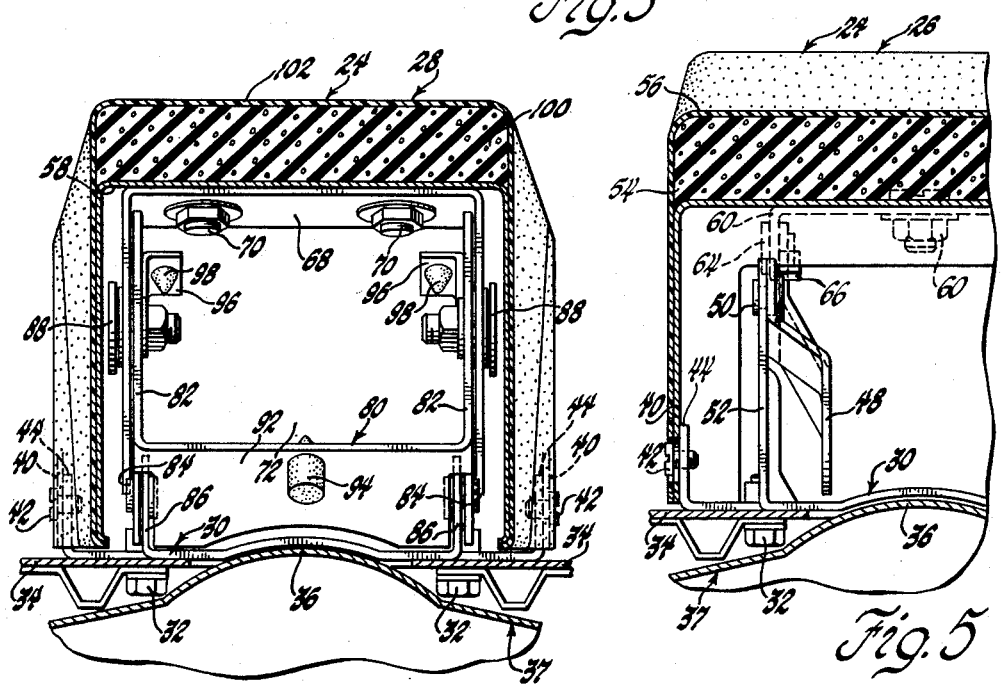
INVENTOR.
Alan J. Shelton
BY
Herbert Furman
ATTORNEY

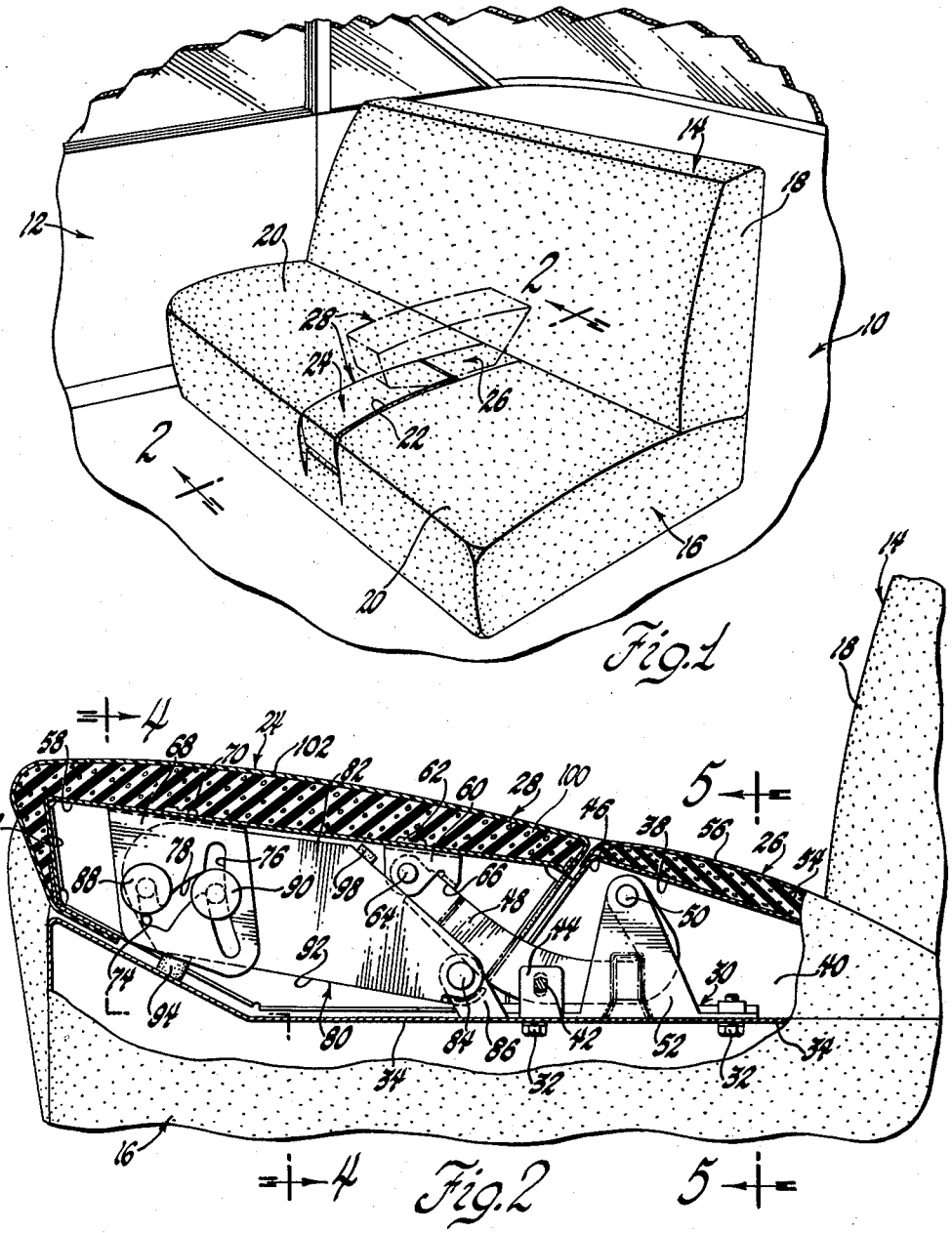

United States Patent Office 3,191,995
Patented June 29, 1965

3,191,995
FOLDING ARM REST
Alan J. Shelton, Birmingham, Mich., assignor to General Motors Corporation, Detroit, Mich., a corporation of Delaware
Filed Sept. 12, 1963, Ser. No. 308,389
5 Claims. (Cl. 297—417)

This invention relates to arm rest assemblies and more particularly to vehicle body arm rest assemblies.

One feature of this invention is that it provides an improved vehicle body arm rest assembly. Another feature of this invention is that it provides an improved vehicle body arm rest assembly including an arm rest movable between a normal position within a vehicle body seat cushion assembly and an operative position disposed above the seat cushion assembly and locking means for releasably holding the arm rest in each position. A further feature of this invention is that it provides a vehicle body arm rest assembly including an arm rest swingably supported on the body by a pair of members for movement between normal and operative positions and including locking means for locking one of the support members to the arm rest in both its normal and operative positions. Yet another feature of this invention is that it provides a vehicle body arm rest assembly including an arm rest and support means swingably supporting the arm rest on the body for movement between normal and operative positions, with the support means including a support member swingably mounted on the body, and pin and slot means pivotally interconnecting the support member and the arm rest and releasably locking the support member to the arm rest in both the normal and operative positions thereof.

These and other features of this invention will be readily apparent from the following specification and drawings wherein:

FIGURE 1 is a partial perspective view of a vehicle body embodying an arm rest assembly according to this invention;

FIGURE 2 is a partially broken away view taken generally along the plane indicated by line 2—2 of FIGURE 1 and showing the arm rest in its normal position;

FIGURE 3 is a view similar to FIGURE 2 and showing the arm rest in its operative position;

FIGURE 4 is an enlarged sectional view taken generally along the plane indicated by line 4—4 of FIGURE 2; and FIGURE 5 is an enlarged sectional view taken generally along the plane indicated by line 5—5 of FIGURE 2.

Referring now particularly to FIGURE 1 of the drawings, a vehicle body 10 includes a front door 12 and a seat 14 which includes a seat cushion assembly 16 and a seat back 18. The seat cushion assembly 16 includes a pair of seat cushions 20 which are separated by an opening 22. An arm rest assembly 24 which generally includes a stationary portion 26 and a movable arm rest 28 fits within the opening 22, with the arm rest 28 being movable between a normal position within the opening as shown in FIGURES 1 and 2 and an operative position outwardly of the opening and above the stationary portion in engagement with the seat back 18 as shown in FIGURE 3.

The support bracket 30 for the arm rest assembly is bolted at 32 to a support member 34 which may be part of the seat cushion frame or separate therefrom. The support member 34 and also the bracket 30 are shaped so as to nest against the tunnel portion 36 of the body floor pan 37, as shown in FIGURES 4 and 5. The stationary portion 26 of the arm rest assembly includes a hollow box-like structure or frame 38, the side walls 40 of which straddle and are adjustably secured at 42 to upwardly extending ears 44 of the bracket 30. The forward wall 46 of the frame 38 is open to allow passage therethrough of a pair of like support members or links 48, the rearward ends of which are pivoted at 50 to upwardly extending ears 52 of the bracket 30. Suitable cushioning material 54, such as foam rubber, seats on the upper wall of the frame 38 and the frame is suitably covered with cloth trim 56 which matches the cloth trim of the seat cushion assembly and seat back.

The arm rest 28 includes a hollow box-like structure or frame 58. A bracket 60 is bolted at 62 to the frame 58 adjacent the rear open wall thereof and the forward ends of the links 48 are pivoted at 64 to the spaced depending ears of the bracket 60. Lateral tabs 66 on each of the ears engage the links 48 in the normal position of the arm rest as shown in FIGURE 2 to locate the arm rest with respect to the links. A channel-shaped bracket 68 has its base bolted at 70 to the frame 58 adjacent the closed forward wall 72 thereof. The depending legs of the bracket 68 are provided with a pair of generally parallel, vertically disposed closed end slots 74 and 76, and an intermediate slot or slot portion 78 which interconnects the lower end of the slot 74 with an intermediate portion of the slot 76. A generally channel-shaped link or support member 80 has the side walls 82 thereof pivoted at 84 to upwardly extending ears 86 of the bracket 30. A pair of headed pins 88 and 90 are secured to each of the walls 82 of the bracket 80 and are adapted to move within the slots 74, 76 and 78 as will be described. Suitable thrust or other washers may be located between the heads of the pins and the bracket 68 and between the brackets 68 and 80 in order to take up lateral movement between the pins and the brackets. The base wall 92 of the bracket 80 mounts a rubber bumper 94 engageable with the support member 34 in the normal position of the arm rest as shown in FIGURE 2 and the side walls 82 of the bracket 80 include small angle brackets 96 mounting rubber bumpers 98 which are engageable with the forward wall 46 of frame 38 when the arm rest is in its operative position. The forward and upper walls of the frame 58 are covered with foam rubber or other resilient material 100, and the frame is trimmed with fabric 102 which is the same as the fabric 56.

When the arm rest is in its normal position as shown in FIGURES 1 and 2, the pins 88 are located at the upper closed end of their respective slots 74 and the pins 90 are located within their respective slots 76 adjacent the juncture of these slots with the slots 78, approximately in alignment with the pins 88. The engagement of the pairs with the sides of their respective slots effectively locks the arm rest 28 to the link 80 so that the arm rest is releasably held in its normally position. When it is desired to move the arm rest to its operative position, the operator first grasps the forward portion of the arm rest 24 and tilts the arm rest upwardly and rearwardly to move the slots 74 relative to the pins 88 and locate the pins 88 at the junctures of the slots 74 with the slots 78. Then the operator moves the arm rest 28 upwardly and rearwardly as the links 48 and 80 swing about their respective pivots 50 and 84 and the arm rest pivots about the pivots 64 and the pins 88 move through the slots 78 into the slots 76 as the pins 90 move slightly downwardly within the slots 76. The pins 88 will be located approximately at the juncture of the slots 76 with the slots 78 and the arm rest will be located in a slightly upwardly and rearwardly tilted position from that shown in FIGURE 3. Thereafter the operator presses downwardly on the forward portion of the arm rest to move the pins 88 into engagement with the upper closed ends of the slots 76 as the pins 90 move slightly downwardly relative to the slots 76 to thereby lock the arm rest to the link 80 in the operative position of the arm rest.

The arm rest is moved from its operative position to its normal position by first pulling upwardly on the forward portion of the arm rest to move the slots 76 relative to the pins 88 and locate the pins at the juncture of the slots 76 and 78 and then moving the arm rest downwardly and forwardly to a position adjacent its normal position and slightly upwardly tilted therefrom. By thereafter pressing downwardly on the forward portion of the arm rest, the pins 88 will be moved relative to the slots 74 and into engagement with the upper closed ends thereof to thereby lock the arm rest in its normal position.

Thus, this invention provides an improved vehicle body arm rest assembly.

I claim:

1. In a vehicle body, the combination comprising, a seat cushion assembly, an arm rest adapted to be moved between a first position flush with said seat cushion assembly and a second operative position disposed over said seat cushion assembly, said arm rest being of box-like structure and including a closed end wall and an open wall adjacent said closed end wall, a first member interconnecting said body and said arm rest and extending through said open wall in said arm rest second position, and a second member interconnecting said body and said arm rest and including means covering said first member and said open wall from view in said arm rest second position and providing a continuation of said closed end wall.

2. In a vehicle body, the combination comprising, a seat, an arm rest member movable between a first position flush with said seat and a second operative position above said seat, a support member having one end thereof mounted on said body, a pair of spaced interconnected slots in one of said members, each having one closed end, and a pin member secured to the other of said members and movable within said slots, said pin member being located adjacent the closed end of one of said slots when said arm rest member is in one of said positions and being located adjacent the closed end of the other of said slots when said arm rest member is in the other of said positions, and means movable within one of said slots and cooperating therewith to prevent pivotal movement between said members when said pin member is located adjacent the closed end of either of said slots.

3. In a vehicle body, the combination comprising, a seat, an arm rest member movable between a first position flush with said seat and a second operative position above said seat, a support member having one end thereof mounted on said body, a pair of spaced slots in one of said members, an intermediate slot interconnecting one of said spaced slots adjacent one closed end thereof with an intermediate portion of the other of said spaced slots to divide said other of said spaced slots into a pair of slot portions, a pin member secured to the other of said members and movable within said slots, said pin member being located adjacent the other closed end of said one spaced slot when said arm rest member is in one of said positions and being movable through said intermediate slot to adjacent the closed end of one of said slot portions when said arm rest member is in the other of said positions, and a second pin member movable within the other of said slot portions and cooperating with said first pin member in preventing pivotal movement between said members when said first pin member is located adjacent said one closed end of said one slot and said closed end of said one slot portion.

4. In a vehicle body, the combination comprising, a seat, an arm rest member movable between a first position flush with said seat and a second operative position above said seat, a support member having one end thereof mounted on said body, a pair of interconnected closed end slots in one of said members, a first pin member secured to the other of said members and movable within said slots, said pin member being located adjacent the closed end of one of said slots when said arm rest member is in one of said positions and being movable to adjacent the closed end of the other of said slots when said arm rest member is in the other of said positions, and a second pin member movable within said other of said slots and cooperating with said first pin member in preventing pivotal movement between said members when said first pin member is located adjacent said closed ends of said slots.

5. In a vehicle body having a seat including a seat cushion assembly having an opening therein, an arm rest assembly comprising, a stationary part fitting within and closing one portion of said opening, said part being of box-like structure and including an open end wall, a movable part adapted to be moved between a first position wherein it closes the other portion of said opening and a second position wherein it is disposed over said stationary part to provide an arm rest, said movable part being of box-like structure and including an open lower wall, a first member interconnecting said body and said movable part and projecting through said stationary part end wall when said movable part is in said second position, and a second member interconnecting said body and said movable part and including means extending between said movable part and said body and covering said first member and both said open walls when said movable part is in said second position.

References Cited by the Examiner

UNITED STATES PATENTS

| 2,771,123 | 11/56 | Clark | 297—115 |
| 2,886,097 | 5/59 | Katz | 297—410 |
| 2,995,648 | 10/60 | Krajewski | 297—417 |

FOREIGN PATENTS

| 746,313 | 3/56 | Great Britain. |

FRANK B. SHERRY, *Primary Examiner.*

UNITED STATES PATENT OFFICE
CERTIFICATE OF CORRECTION

Patent No. 3,191,995                          June 29, 1965

Alan J. Shelton

It is hereby certified that error appears in the above numbered patent requiring correction and that the said Letters Patent should read as corrected below.

Column 2, line 51, after "pairs" insert -- of pins --; line 54, for "normally" read -- normal --; column 4, line 52, for "2,995,648" read -- 2,955,648 --.

Signed and sealed this 21st day of December 1965.

(SEAL)
Attest:

ERNEST W. SWIDER                                  EDWARD J. BRENNER
Attesting Officer                                         Commissioner of Patents